United States Patent
Kato

(10) Patent No.: US 10,195,986 B2
(45) Date of Patent: Feb. 5, 2019

(54) VEHICULAR ILLUMINATION HOLDING STRUCTURE

(71) Applicant: HAYASHI TELEMPU CORPORATION, Naku-ku, Nagoya-shi, Aichi (JP)

(72) Inventor: Naoyuki Kato, Nagoya (JP)

(73) Assignee: HAYASHI TELEMPU CORPORATION, Naka-ku, Nagoya-shi, Aichi (JP)

( * ) Notice: Subject to any disclaimer, the term of this patent is extended or adjusted under 35 U.S.C. 154(b) by 0 days.

(21) Appl. No.: 15/769,003

(22) PCT Filed: Oct. 7, 2016

(86) PCT No.: PCT/JP2016/080011
§ 371 (c)(1),
(2) Date: Apr. 17, 2018

(87) PCT Pub. No.: WO2017/069008
PCT Pub. Date: Apr. 27, 2017

(65) Prior Publication Data
US 2018/0312108 A1    Nov. 1, 2018

(30) Foreign Application Priority Data
Oct. 21, 2015  (JP) ................................ 2015-207466

(51) Int. Cl.
*B60Q 3/54* (2017.01)
*B60Q 3/217* (2017.01)
(Continued)

(52) U.S. Cl.
CPC ............. *B60Q 3/217* (2017.02); *B60Q 3/267* (2017.02); *B60Q 3/64* (2017.02)

(58) Field of Classification Search
CPC ........... B60Q 3/217; B60Q 3/64; B60Q 3/267
See application file for complete search history.

(56) References Cited

U.S. PATENT DOCUMENTS

| 6,594,417 | B1 * | 7/2003 | Hulse | G02B 6/001 |
| | | | | 362/487 |
| 9,376,057 | B2 | 5/2016 | Willerton | |

(Continued)

FOREIGN PATENT DOCUMENTS

| JP | 2007179962 A | 7/2007 |
| JP | 2012129146 A | 7/2012 |

(Continued)

OTHER PUBLICATIONS

International Search Report and English Translation thereof for International Application No. PCT/JP2016/080011, dated Dec. 20, 2016 (2 pages).

(Continued)

*Primary Examiner* — Anabel Ton
(74) *Attorney, Agent, or Firm* — Kagan Binder, PLLC

(57) ABSTRACT

A vehicular illumination holding structure comprising: a bar-shaped light guide installed in an interior trim; a holding member that holds the light guide; and a transmitting portion of the interior trim, wherein an emission surface of the light guide extends along longitudinal direction thereof and faces the transmitting portion, the transmitting portion is disposed with a gap from the emission surface, the holding member extends from the interior trim, the holding members have, at leading end portions thereof, engagement bodies engaged with a first longitudinal side surface of the light guide, the interior trim further includes support portions and step portions, where the support portions extend over a second side surface of the light guide to reach the emission surface, the second side surface being a surface opposed to the first side surface, and the step portions connect the support portions and the transmitting portion.

4 Claims, 4 Drawing Sheets

(51) Int. Cl.
*B60Q 3/64* (2017.01)
*B60Q 3/267* (2017.01)

(56) References Cited

U.S. PATENT DOCUMENTS

| | | | | |
|---|---|---|---|---|
| 2015/0003093 A1* | 1/2015 | Omura | ................... | B60Q 3/51 |
| | | | | 362/511 |
| 2016/0107566 A1* | 4/2016 | Gasahl, IV | ............ | G02B 6/001 |
| | | | | 362/581 |
| 2018/0031756 A1* | 2/2018 | Harada | ................... | B60Q 3/50 |

FOREIGN PATENT DOCUMENTS

| | | | |
|---|---|---|---|
| JP | 2013086532 A | 5/2013 |
| JP | 2014041813 A | 3/2014 |
| JP | 2015154120 A | 8/2015 |

OTHER PUBLICATIONS

English Translation of PCT Original Claims of present application PCT/JP2016/080011 (2 pages).

* cited by examiner

VEHICULAR ILLUMINATION HOLDING STRUCTURE

CROSS-REFERENCE TO THE RELATED APPLICATION

This application is a continuation application, under 35 U.S.C. § 111(a), of international application No. PCT/JP2016/080011, filed Oct. 7, 2016, which claims priority to Japanese Patent Application No. 2015-207466, filed Oct. 21, 2015, the entire disclosure of which is herein incorporated by reference as a part of this application.

BACKGROUND OF THE INVENTION

Field of the Invention

The present invention relates to an illumination holding structure for a vehicle, in particular, for an automobile.

Description of related art

The interior (sometimes the exterior) of an automobile is provided with illumination (lighting) structures to be used by occupants (a driver and/or passengers) of the automobile. The illumination structures include a direct type where the light emitted from an illumination device directly enters the eyes of the occupants, and an indirect type where the light emitted from an illumination device is reflected by an irradiated portion of an interior member of the automobile, and indirectly enters the eyes of the occupants. Such indirect illumination realizes various effects such as reduction of glare, enhancement of design quality by generation of a pattern at the irradiated portion, and enhancement of operability of the automobile by making the irradiated portion conspicuous thereby allowing easy recognition of the position thereof.

It has been a general technique in the conventional art to provide an elongated light guide to an illumination structure in an automobile compartment (for example, an illumination structure at a door trim).

For example, the applicant has proposed an illumination device equipped with a light guide having an elongated irradiation portion in an ornamental portion of a door trim (Japanese Patent No. 5608538).

In the light guide of elongated shape used in the conventional arts, a pattern of grooves is formed in a surface of the light guide such that the grooves extend in a direction orthogonal to the longitudinal direction of the light guide, thereby enhancing the light diffusion effect to achieve homogeneous irradiation of light (for example, Japanese Patent No. 4529900).

In the conventional illumination structure, the light guide is sometimes covered by a housing to prevent damage to the light guide. In such a case, there has been a problem of heterogeneous light emission at a contact portion where the light guide is made contact with the housing. Further, in the conventional structure for fixing and holding the light guide, for example, shown in FIG. 4 of Japanese Patent No. 5608538, the light guide has been supported by rib portions that extend along the entire width of the light guide. The presence of contact area between the light guide and the support body (rib) has caused anomalous light emission from the light guide, resulting in failure of homogeneous emission.

An object of the present invention is to address the problem of anomalous light emission caused by contact between a light guide and a support body by improving vehicular illumination holding structure, and thereby enhancing homogeneity of irradiation in a vehicle compartment.

SUMMARY OF THE INVENTION

A vehicular illumination holding structure of the present invention includes:
a bar-shaped light guide that is installed in an interior trim;
holding members that hold the light guide; and
a transmitting portion provided as a part of the interior trim,
wherein an emission surface of the light guide extends along longitudinal (lengthwise) direction of the light guide and faces the transmitting portion of the interior trim,
the transmitting portion is disposed with a gap (interstices) from the emission surface of the light-guide,
the holding members extend from the interior trim,
the holding members have, at leading end portions thereof, engagement bodies that are engaged with a first longitudinal side surface of the light guide,
the interior trim further includes support portions and step portions,
where the support portions extend over a second side surface of the light guide to reach the emission surface of the light guide, the second side surface being a surface opposed to the first side surface, and
the step portions connect the support portions and the transmitting portion.

According to the above-described vehicular illumination holding structure, the transmitting portion and the emission surface of the light guide is not made contact with each other, whereby anomalous light emission can be suppressed.

In the above-described vehicular illumination holding structure, the support portions preferably extend to a vicinity of a prism (optical pattern) formed at a reflection surface, that is, a surface opposed to the emission surface of the light guide. Here, the vicinity means an area with a distance of 0.2 D or less from an end of the prism (an end closer to the second side surface of the light guide), where D denotes a dimension of the prism along the width direction (cross direction) of the light guide.

Preferably, in the above-described vehicular illumination holding structure, the location of the prism formed on the reflection surface of the light guide may be deviated to the first side surface of the light guide.

According to the above configuration, light transmits the reflection surface at an area above the support portions, and illumination light guided through multiple reflections and emitted from the emission surface of the light guide is mainly emitted from the portion located outside the support portions. Thus, occurrence of anomalous light can be further suppressed efficiently.

In the above-described vehicular illumination holding structure, the engagement bodies and the support portions may be alternately arranged along the longitudinal direction of the light guide. In the vehicular illumination holding structure having such a configuration, the light guide can be stably supported in the interior trim, while reducing the area of the support portions in contact with the light guide, and thereby suppressing occurrence of anomalous light.

According to the above-described configuration of the vehicular illumination holding structure, since a fixing member and the emission region of the light guide are not made contact with each other, it is possible to avoid anomalous light emission due to such a contact, and thereby realizing homogeneous light emission from the light guide.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DETAILED DESCRIPTION OF THE INVENTION

Hereinafter, embodiments of the present invention are described with reference to the drawings.

(Door Trim)

In the description of the present invention, a vehicular illumination structure means an interior or exterior structure of a vehicle (for example, automobile) including a member (component) of the vehicle illuminated with light emitted from an illumination device. A vehicular illumination holding structure (an illumination structure of a vehicle) means a structure that includes: in the above illumination structure, an illumination device (in particular, an illuminating body (lighting body) such as a light guide); and a member that holds the illumination device.

Figure 1:
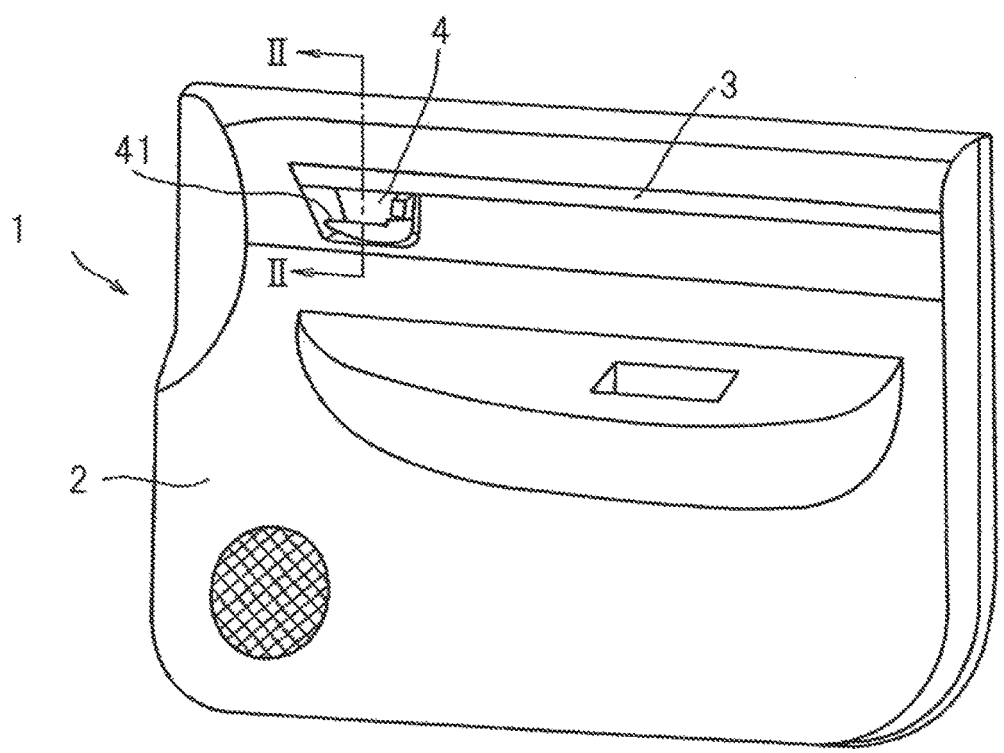
FIG. 1 is a perspective view of a door trim including an illumination device according to the present invention.

A vehicular illumination holding structure of the present invention and an illumination structure including the vehicular illumination holding structure can be a part of the configuration of a door trim of an automobile. FIG. 1 is a perspective view of a door trim 1 including the illumination holding structure according to the present invention.

Figure 2:
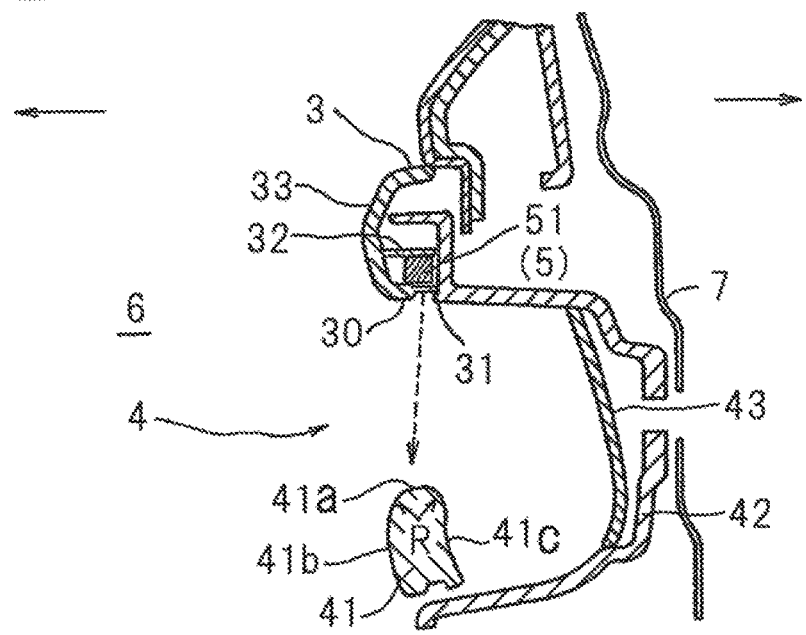
FIG. 2 is a cross sectional view along a line II-II shown in FIG. 1.

FIG. 2 shows a cross-sectional view along the line II-II shown in FIG. 1. In the drawing, the right arrow is directed to outside the vehicle compartment, and the left arrow is directed to inside the vehicle compartment, and a reference numeral 7 indicates an outer plate of the door. An illumination device 5 is held at the outer side (with respect to the vehicle compartment) of a decoration member 3 of the door trim 1, that is a part of an interior trim. Light emitted from the illumination device irradiates the interior of the vehicle. In the present embodiment, a light guide 51 used in the illumination device 5 has a long (elongated) bar shape, and is disposed such that the longitudinal direction thereof extends along the front-rear direction (in the closed-door state) of the door trim. In an illumination structure 6 of the present embodiment, a grip section (grip) 41 of an inside handle unit 4 as an irradiated portion is illuminated with light emitted from the above-described illumination holding structure.

The inside handle unit 4 includes a grip section 41, a bezel 42, and a cover body 43. The shape of the grip section 41 is determined in consideration of design quality and operability. In the grip section 41 of the present embodiment, curved surfaces are formed at a predetermined curvature R so as to continuously extend from a top face 41a facing the decoration member 3 to a side face 41b facing the interior of the vehicle compartment and to a side face 41c facing the cover body 43.

(Illumination Holding Structure)

Figure 3:
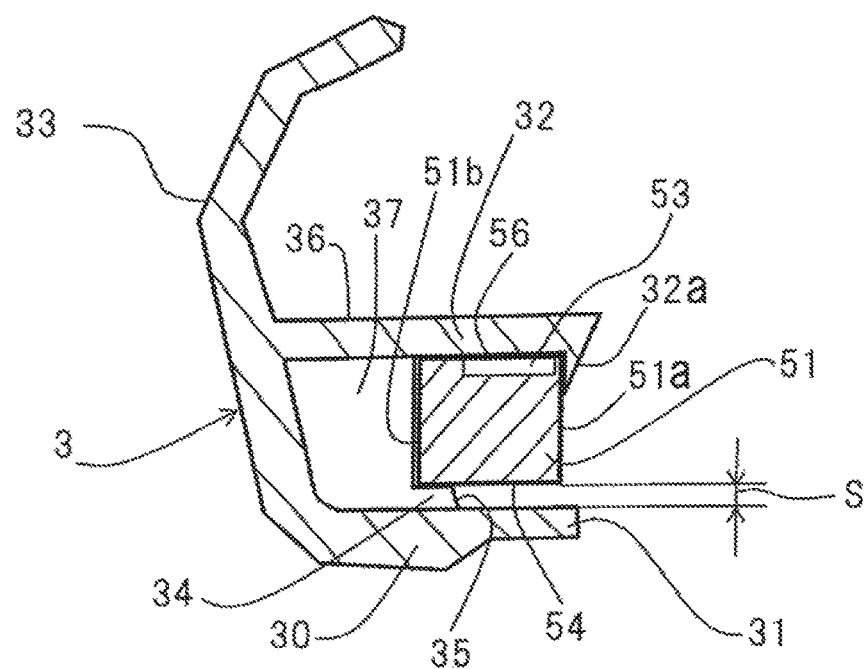
FIG. 3 is a schematic cross-sectional view showing an illumination holding structure used in the present invention.

FIG. 3 shows an enlarged schematic cross-sectional view of a part of the illumination holding structure shown in FIG. 2.

An engagement portion 32 (holding member) having an engagement claw (engagement body) 32a is formed at the outer side (with respect to the vehicle compartment) of the decoration member 3. A plurality of engagement portions 32 are formed along the longitudinal direction of the light guide 51. The light guide 51 is sandwiched and fixed by the engagement portions 32 and support portions 34 formed in the decoration member 3, whereby the decoration member 3 plays a role of a holding body (holding member, holder) that holds the light guide 51. In the present embodiment, a thin transmitting (light permeable) portion 31 is provided in a bottom wall 30 of the decoration member 3. Light emitted from the light guide 51 passes through the transmitting portion 31 and is irradiated to an irradiated portion. The material of the decoration member 3 is not particularly limited. For example, polycarbonate is used in the present embodiment, thereby allowing irradiation of light through the transmitting portion 31 made of thin polycarbonate. Excluding the transmitting portion 31, a surface of the decoration member 3 facing the interior of the vehicle compartment constitute a design surface 33 which may be provided with a coating of (arbitrary) desired color to enhance quality of design. As an alternative to the coating, a skin layer may be laminated to the design surface 33.

As shown in FIG. 3, the transmitting portion 31 is formed such that the upper face thereof is spaced apart by a predetermined interval from a lower surface, that is, an emission surface 54 of the light guide 51. Thus, a step portion 35 is formed between the support portion 34 and the transmitting portion 31. In the present invention, due to the above-described configuration, a gap S is provided between the light guide 51 and the transmitting portion 31. Thus, occurrence of anomalous light due to the presence of the contact area can be inhibited. Here, the size of the gap S is preferably about 0.1 to 10 mm, more preferably, 0.5 to 5 mm.

Figure 4:
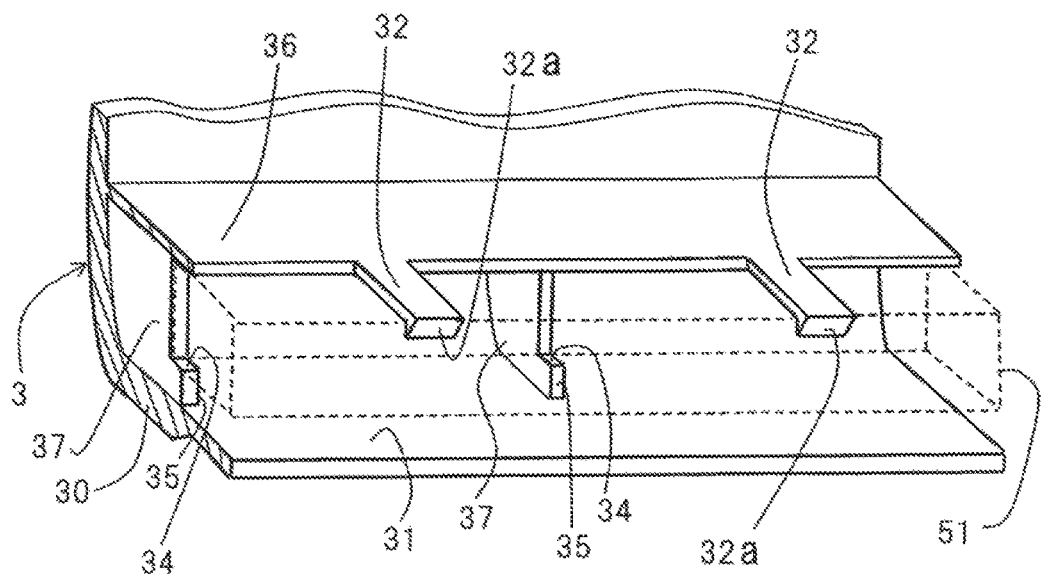
FIG. 4 is a perspective view showing a form of a partial portion of an interior trim constituting an illumination holding structure.

As an embodiment of a shape of the interior trim according to the present invention, FIG. 4 shows a perspective view of a cutout part of the decoration member 3 holding the light guide 51. As shown in FIG. 4, an eaves portion (flange portion) 36 is provided along the side wall of the decoration member 3 such that a partial portion (vicinity of a side end located above the support portions) of a reflection surface 55 of the light guide is held (pressed) by the eaves portion 36. The engagement portions 32 extend from the eves portion 36. Alternatively, the engagement portions 32 may protrude directly from the side wall of the decoration member 3 while omitting the eaves portion. The engagement claw 32a at the leading end of each of the engagement portions 32 shown in FIG. 3 is engaged with one side surface (a first side surface) 51a of the light guide 51 elongated along the longitudinal direction of the light guide 51.

Support portions 34 are formed on the upper surface of a bottom wall 30 of the decoration member 3 such that the support portions 34 protrude upwardly from the bottom wall 30 at an appropriate interval (spacing) with each other. Since the light guide 51 is supported on the support portions 34, the light guide 51 is spaced apart from the transmitting portion 31.

Preferably, the engagement portions 32 and the support portions 34 are alternately disposed along the longitudinal direction of the light guide 51. In this case, the portions in contact with the support portions 34 and the portions in contact with the engagement claws 32a are disposed such that line segments connecting these portions appear a zigzag shape in a top view projection. In addition, the support portions 34 and the engagement portions 32 are disposed such that line segments connecting these portions appear a zigzag shape in a side view projection.

Each support portion 34 is provided as a partial portion of a bulkhead wall 37 that controls the position of the light guide 51 and reinforces the eaves portions 36. Alternatively, the support portions 34 may directly protrude from side wall of the decoration member while omitting the bulkhead walls 37.

Preferably, the portions where the support portions 34 are in contact with the light guide 51 do not overlap the light emission region (main emission region) in the emission surface 54 of the light guide 51, and thus, preferably, are not present directly below optical patterns (prisms) 53 formed in the reflection surface 56 of the light guide 51. On the other hand, each support portion 34 preferably extends to the vicinity of the optical patterns (prisms) 53 in a top view so as to support the light guide 51 stably. For example, each support portion 34 may extend to a position with a distance (in a top view) of 0.2 D or less from a side end (in the side of the support portion) of the prism, where D is a dimension of the prism in the width direction of the light guide 51. In order to suppress shielding of the light emitted from the light guide 51 as small as possible, the support portion 34 is preferably has a thin plate shape having a small dimension along the longitudinal direction of the light guide 51.

When the eaves portion 36 presses a part of the reflection surface of the light guide 51, the portion where the eaves portion 36 is in contact with the light guide 51 is preferably does not overlap the light reflection region (main reflection region) of the light guide 51, and thus, preferably, does not overlap the region in the reflection surface 56, where the optical patterns 53 are formed.

(Illumination Device)

Figure 5:
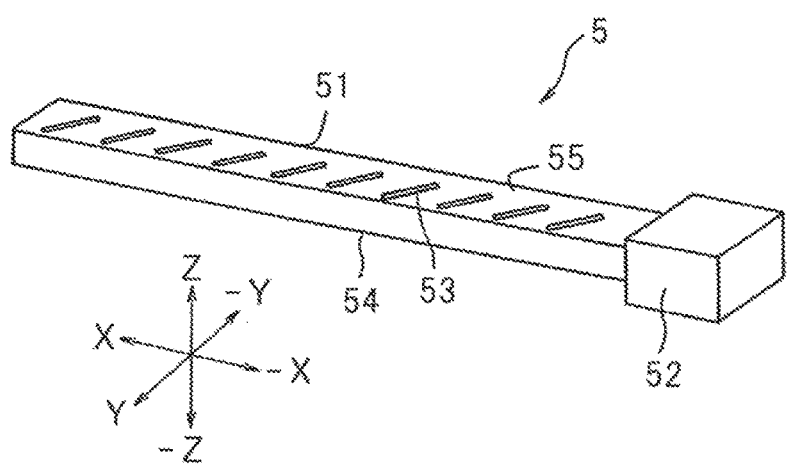
FIG. 5 is a schematic perspective view showing an illumination device used in an embodiment of the present invention.

FIG. 5 is a perspective view of an illumination device 5 used in the present invention. The illumination device 5 of the present embodiment includes a light source 52 at one end of the light guide 51 having a long bar shape. The light source includes a light source body, a case body, and a wiring harness which are not shown, and is assembled to a door trim body by an engagement portion formed in the case body. The harness is connected, via a connector, to a power supply for electronic components which is not shown and which is provided inside the vehicle compartment.

The type of the light source body is not particularly limited. An incandescent lamp, a halogen lamp, or the like can be used. For example, a light emitting diode (LED) may be used. As the LED, an LED having any color and any shape such as a bullet-type or an SMD-type may be used. As an example, NSSW064A manufactured by NICHIA CORPORATION may be used. In the present embodiment, the light source is provided only at one end of the light guide. In alternative embodiments, the light source may be provided at both ends of the light guide, to prevent heterogeneous light emission. In addition, a plurality of light source bodies having different light emission colors may be used to enhance the design effect.

(Light Guide)

Although the light guide of the present embodiment has an elongated (long) bar shape, the light guide may have a plate shape, a tubular shape, or the like, instead of the bar shape. The axis of the light guide may not be in a straight line, but may be in a curved line or a composite of a straight line and a curved line. The cross sectional shape of the light guide is not limited in particular, and may be circular or trapezoidal. In the present embodiment, the cross sectional shape of the light guide is rectangular (for example, 5 mm in width and 2 to 5 mm in height). The material of the light guide is not particularly limited. For example, the material of the light guide may be an acrylic resin. PMMA is used in the present embodiment. For the purpose of giving a color to the light, or diffusing the light, or the like, an additional layer may be formed on the surface of the light guide by, for example, by applying a coating or by bonding a film.

The cross sectional shape of the optical pattern 53 is not limited in particular, and may be triangular, elliptical, quadrangular, or the like, instead of semicircular shape. In the present embodiment, the cross sectional shape of the optical pattern 53 has a semicircular groove shape shown in FIG. 7. Preferably, the ratio of a groove depth d to a height h of the cross section of the light guide bar is $d/h=0.02$ to $0.25$. As one example, $d=0.1$ mm may be employed.

Figure 6:
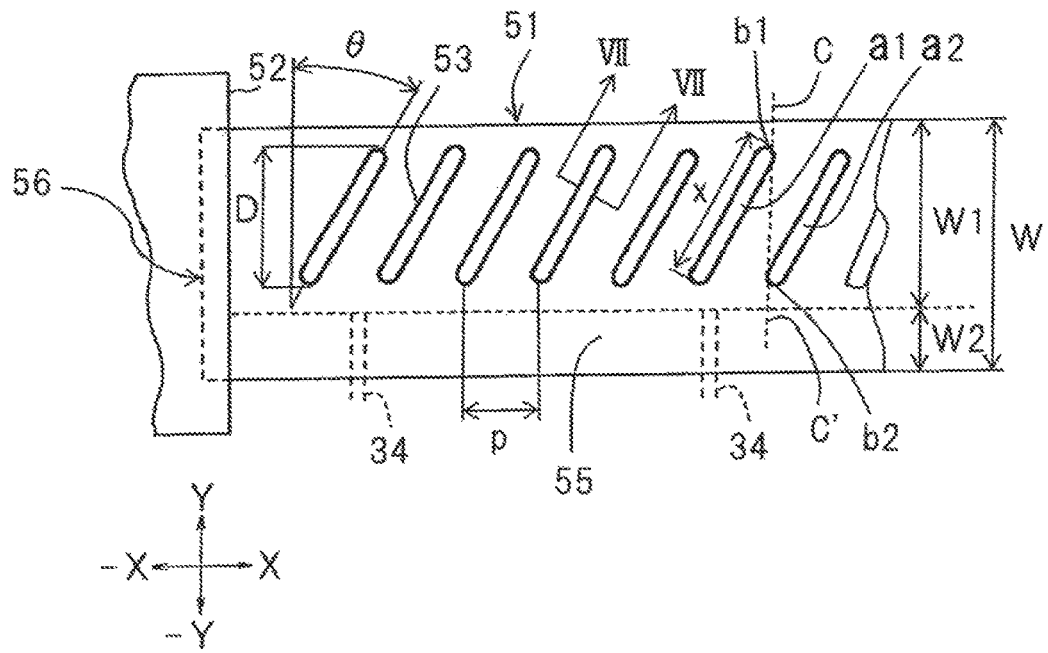
FIG. 6 is a partial enlarged view of the illumination device.
Figure 7:
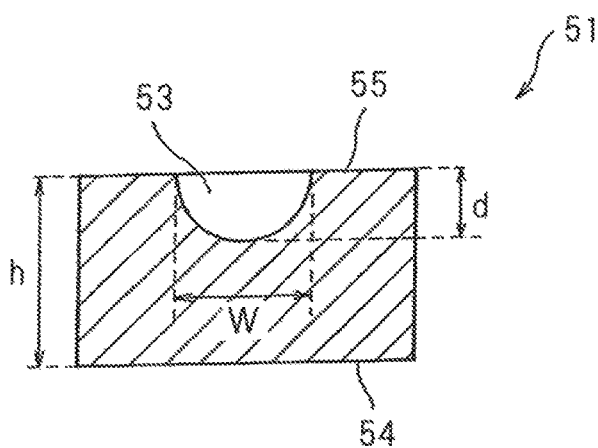
FIG. 7 is a schematic cross-sectional view of an optical pattern (prism) formed in the light guide.

FIG. 6 shows a partial enlarged view of the light guide 51 used in the present embodiment. FIG. 7 shows a view of a cross section along the line VII-VII shown in FIG. 6. Light emitted from the light source 52 shown in FIG. 5 enters from an incident surface 56 formed at one end of the bar-shaped light guide 51 and is directed toward the other end in the longitudinal direction. The light reflected by the optical patterns formed in the reflection surface 55 shown in FIG. 6 travels toward the emission surface 54 opposed to the reflection surface 55, passes through the emission surface 54 and the transmitting portion 31 of the decoration member 3 shown in FIG. 2, and is irradiated to the grip section 41 as the irradiation target. As for the shape, the dimensions, and the like of the optical pattern 53 shown in FIG. 6, an optimum condition is preferably selected on the basis of the size and the shape of the light guide 51, the material and the shape of the grip section 41, the positional relationship between the light guide 51 and the grip section 41, and the like.

Preferably, each optical pattern 53 is formed so as to be inclined with respect to a plane (Y-Z plane) orthogonal to the longitudinal direction (X axis direction) of the light guide shown in FIG. 5. By this configuration, when light is irradiated to a curved surface of an illuminated body, the image on the curved surface appears a shape of single line due to overlapping of adjacent optical patterns with each other. The range of an inclination angle θ (inclination angle with respect to the Y-Z plane) of the optical pattern 53 shown in FIG. 6 is 10° to 80°, preferably 20° to 60°, and more preferably 25 to 40°. The inclination angle of the optical pattern may be constant (for example, θ=30° in FIG. 6). Alternatively, the inclination angle θ of the optical pattern may be varied depending on the conditions such as the shape of the grip section 41, the arrangement of the light guide, and the like. While, in the illustrated embodiment, the positive direction of the inclination angle θ is set to be the clockwise direction in the X-Y plane when viewed from the reflection surface 55 side, the positive direction of the inclination angle θ may be set to be the counterclockwise direction. That is, the orientation of the inclination of the optical pattern 53 shown in FIG. 6 may be reversed with respect to the positive direction and the negative direction of the X axis.

With respect to adjacent optical patterns of the plurality of the optical patterns 53, a longitudinal end b1 on one side of an optical pattern a1 and a longitudinal end b2 on the other side of an optical pattern a2 adjacent to the optical pattern a1 may have substantially the same coordinates in the direction (X axis direction) in which the light guide 51 extends. That is, where an end of an optical pattern a1 at the positive X side with respect to the X axis direction is shown by b1, and an end of an adjacent optical pattern a2 at the negative X side with respect to the X axis direction is shown by b2, the line C that passes b1 and is parallel to Y-Z plane and the line C' that passes b2 and is parallel to Y-Z plane may overlaps consistently in the X-Y plane. By this constitution, when the light is irradiated to the curved surface, the image reflected by the curved surface easily takes a line shape.

Adjacent optical patterns may overlap with each other without a gap therebetween, such that the coordinates thereof in the longitudinal direction of the light guide 51 slightly overlap with each other. That is, where an end of an optical pattern a1 at the positive X side with respect to the X axis direction is shown by b1, the line C that passes the end b1 and is parallel to Y-Z plane may cross the optical pattern a2 adjacent to the optical pattern a1 in the X axis positive direction. In addition, where an end of an adjacent optical pattern a2 at the negative X side with respect to the X axis direction is shown by b2, the line C' that passes the end b2 and is parallel to Y-Z plane may cross the optical pattern a1. By this constitution, when the light is irradiated to the curved surface, the image reflected by the curved surface takes a line shape more easily.

According to the above-described configuration, in the two optical patterns a1 and a2 adjacent to each other, at least a partial portion of one optical pattern a1 and at least a partial portion of the other optical pattern a2 are on the same plane orthogonal to the longitudinal direction of the light guide.

In the present embodiment, optical patterns 53 of the same length (for example, x=1.9 mm) are disposed at the same pitch (for example, p=1.0 mm). In alternative embodiments, depending on the conditions such as the shape of the inside handle 41 and the arrangement of the light guide 51, a pitch p between adjacent optical patterns may be varied, or the dimensions (at least one of length x, depth d, width w, etc.) of the optical pattern 53 may be varied. For example, the depth d of the optical pattern may be varied within a range of about 0.1 to 0.5 mm.

The light guide 51 may have a tapered shape such that the cross sectional area (in Y-Z section) of the light guide decreases with increasing distance from the light source 52. The number of reflections of light in the light guide 51 is increased by this constitution. As a result, it is possible to increase the emission intensity and to prevent darkening of the light guide 51 in the vicinity of the leading end.

In the embodiment shown in FIG. 6, the optical patterns 53 are formed in a region deviated to one side surface 51a of the light guide. The emission surface 34 is supported by the support portions 34 at the vicinity of the other side surface 51b. Since the optical pattern is not formed in the reflection surface in the vicinity of the side surface 51b, influence of contact with the support portions 34 on light emission can be suppressed.

Where the width of the main light emission region (main reflection region), that is, the width determined by subtracting the with W2 of the region supported by the support portions 34 from the width W (transversal width) of the light guide is defined as W1, the length of the optical patterns 53 along Y-direction on the X-Y plane (the length in the width direction on the reflection surface of the light guide) is defined as D, and the pitch (interval) between adjacent optical patterns 53 is defined as p, it is preferable that D/W1=0.2 to 0.8, and it is more preferable that D/W1=0.25 to 0.40. In addition, it is preferable that p/W1=0.1 to 0.8, and it is more preferable that p/W1=0.2 to 0.4. In FIG. 6, the optical patterns (prism) 53 are provided at a center portion in the width W1. In alternative embodiments, the optical patterns 53 may be located closer to the support portions 34 in the width W1. In this case, with respect to the position in the width direction, the position of a side end of each optical pattern 53 (for example, the side end b2 of the optical pattern a2) may be aligned with the position of the leading end of the support portion 34.

Preferably, the ratio of the width W2 of the portion supported by the support portions 34 to the width W of light guide (W2/W) is about 0.1 to 0.4, and more preferably, about 0.2 to 0.3. When the light guide is in contact with the eaves portion 36, the width of the portion is preferably W2 or less. The optical patterns may be provided at a center portion in the width direction of the light guide 51.

The light guide may have a tapered shape such that the cross sectional area of the light guide decreases with increasing distance from the light source. The number of reflections of light in the light guide is increased by this constitution. As a result, it is possible to increase the emission intensity and to prevent darkening of the leading end of light guide.

In the present embodiment, an injection molding die for forming the light guide is provided with projected portions at positions corresponding to the optical patterns, thereby forming the optical patterns simultaneously with the injection molding of the light guide. The formation method of the optical patterns is not limited to this method. The optical patterns may be formed after the injection molding, for example, by machining, laser processing, or the like.

Although the present embodiment has been described using a door trim as an example, the target to which the automobile illumination holding structure is provided is not limited to the door trim, and may be an instrument panel, a ceiling, a center console, or the like. The target portion to be irradiated with light in the door trim may be an inside handle, a switch panel, an assist grip, or the like. Thus, the interior trim is not limited to the decoration member of the door trim. In addition, the present invention may be applied to a component outside the vehicle compartment, not limited to a component inside the vehicle compartment.

The present invention is not limited to the embodiment described above, and can be modified or changed without departing from the contents described in claims.

According to the automobile illumination holding structure of the present invention, it is possible: to suppress anomalous light emission caused by contact between a light guide and an interior trim member which holds the light guide; to apply illumination light in a uniform light emission state to an illuminated portion of an automobile member; and to improve the operability and the quality of design of the automobile.

REFERENCE NUMERALS

3 . . . interior trim (decoration member)
30 . . . bottom wall
31 . . . transmitting portion
32 . . . engagement portion (holding member)
33 . . . design surface
34 . . . support portion
35 . . . step portion
51 . . . light guide
53 . . . optical pattern (prism)

What is claimed is:

1. A vehicular illumination holding structure comprising:
a bar-shaped light guide that is installed in an interior trim;
holding members that hold the light guide; and
a transmitting portion of the interior trim,
wherein an emission surface of the light guide extends along longitudinal direction of the light guide and faces the transmitting portion of the interior trim,
the transmitting portion is disposed with a gap from the emission surface of the light-guide,
the holding members extend from the interior trim,
the holding members have, at leading end portions thereof, engagement bodies that are engaged with a first longitudinal side surface of the light guide,
the interior trim further includes support portions and step portions,
where the support portions extend over a second side surface of the light guide to reach the emission surface of the light guide, the second side surface being a surface opposed to the first side surface, and
the step portions connect the support portions and the transmitting portion.

2. The vehicular illumination holding structure as claimed in claim 1, wherein
the support portion preferably extends to a vicinity of a location of prism formed at a reflection surface opposed to the emission surface of the light guide.

3. The vehicular illumination holding structure as claimed in claim 2, wherein
a location of the prism formed in the reflection surface of the light guide is deviated to the first side surface of the light guide.

4. The vehicular illumination holding structure as claimed in claim 1, wherein
the engagement bodies and the support portions are alternately arranged along the longitudinal direction of the light guide.

* * * * *